United States Patent [19]

Vives

[11] Patent Number: 4,916,179

[45] Date of Patent: Apr. 10, 1990

[54] INHIBITION OF POLY(ARYLENE SULFIDE) RESIN INDUCED METAL CORROSION

[75] Inventor: Van C. Vives, Bartlesville, Okla.

[73] Assignee: Phillips Petroleum Company, Bartlesville, Okla.

[21] Appl. No.: 201,141

[22] Filed: Jun. 2, 1988

[51] Int. Cl.$^4$ .............................................. C08K 3/30
[52] U.S. Cl. ................................... 524/421; 524/418; 524/609
[58] Field of Search ............................... 524/418, 421

[56] References Cited

U.S. PATENT DOCUMENTS

| | | | |
|---|---|---|---|
| 3,354,129 | 11/1967 | Edmonds et al. | 260/79 |
| 3,919,177 | 11/1975 | Campbell | 260/79.1 |
| 4,017,450 | 4/1977 | Bailey | 260/37 R |
| 4,115,344 | 9/1978 | Brady | 260/37 R |
| 4,127,713 | 11/1978 | Campbell | 528/391 |
| 4,212,793 | 7/1980 | Shue | 260/45.85 T |
| 4,424,339 | 1/1984 | Idel et al. | 528/388 |
| 4,529,769 | 7/1985 | Johnson et al. | 524/425 |
| 4,585,700 | 4/1986 | Johnson et al. | 428/419 |
| 4,703,088 | 10/1987 | Tieszen et al. | 525/189 |
| 4,716,212 | 12/1987 | Gaughan | 528/226 |

FOREIGN PATENT DOCUMENTS

| | | |
|---|---|---|
| 0075769 | 9/1982 | European Pat. Off. . |
| 3205996 | 9/1983 | Fed. Rep. of Germany . |
| 3339538 | 5/1985 | Fed. Rep. of Germany . |

*Primary Examiner*—John C. Bleutge
*Assistant Examiner*—David W. Woodward
*Attorney, Agent, or Firm*—Beverly M. Dollar

[57] ABSTRACT

The tendency of poly(arylene sulfide) resin to cause mold corrosion upon molding is inhibited by mixing, prior to said molding, the poly(arylene sulfide) resin and lithium sulfite alone, or a combination of lithium sulfite and alkali or alkaline earth metal carbonates, alkali metal or alkaline earth metal borates, or mixtures thereof.

12 Claims, No Drawings

INHIBITION OF POLY(ARYLENE SULFIDE) RESIN INDUCED METAL CORROSION

FIELD OF THE INVENTION

The present invention relates to poly(arylene sulfide) resin compositions. In another aspect this invention relates to a method for improving a poly(arylene sulfide) resin so that it will be less likely to cause metal in contact therewith to corrode. In a further aspect this invention relates to a method for at least substantially eliminating the tendency of poly(arylene sulfide) resin to cause corrosion of the molds employed in molding processes.

BACKGROUND OF THE INVENTION

Poly(arylene sulfide) resin, an engineering thermoplastic having outstanding ability to withstand high temperatures and chemical attack, is commercially available. It has been observed that occasionally during the injection molding of certain poly(arylene sulfide) resins mold corrosion occurs. The corrosion has varied from only a slight attack of the mold after extensive molding to very extensive damage after molding for only a short time. Molds of beryllium, copper, and Vega tool steel are most susceptible to such mold corrosion, while molds of stainless steel, such as 303 Stainless, 304 Stainless, and 316 Stainless, and molds with chrome or nickel plating are most resistant to such corrosion. The use of special corrosion-resistant stainless steel mold and chrome or nickel-plated molds can pose an economic burden upon plastic fabricators that do not already have such molds.

It is known to mix certain compounds with the poly(arylene sulfide) resin prior to molding in order to inhibit corrosion of the mold metals, as described in U.S. 4,017,450. In the above referenced patent publication, alkali metal carbonates or hydroxides are disclosed as corrosion inhibitors; and sodium sulfite is disclosed as not inhibiting corrosion.

In a method typical of the above patent, an alkali metal carbonate such as lithium carbonate is incorporated into the poly(arylene sulfide) resin prior to the molding process. However, the development of other additives for combating the corrosion problem would be beneficial for the development of the poly(arylene sulfide) resin technology.

It is an object of my invention to reduce or eliminate mold corrosion resulting when poly(arylene sulfide) resins are molded.

A further object is to provide a poly(arylene sulfide) resin composition that is less likely to cause mold corrosion than prior art poly(arylene sulfide) resin compositions.

SUMMARY OF THE INVENTION

I have discovered that mold corrosion accompanying the molding of poly(arylene sulfide) resins can be inhibited by the employment of a sufficient amount of lithium sulfite. This is indeed surprising in view of U.S. 4,017,050 showing that sodium sulfite is not effective.

I have also discovered that combinations of lithium sulfite with at least one of an alkali metal or alkaline earth metal carbonate and alkali metal or alkaline earth metal borate are highly effective to inhibit mold corrosion.

DESCRIPTION OF THE PREFERRED EMBODIMENTS

My invention is directed to the improvement of any poly(arylene sulfide) resins which contribute to the corrosion of metals, regardless of the method of preparaton of the resins.

According to my invention the tendency of a poly(arylene sulfide) resin during molding thereof to cause metal corrosion is reduced by employing in combination with the resin an effective inhibiting amount of (a) lithium sulfite or (b) lithium sulfite plus at least one of an alkali metal or alkaline earth metal carbonate and an alkali metal or alkaline earth metal borate.

The lithium sulfite useful in this invention can be in either the hydrated or anhydrous form. The anhydrous form of lithium sulfite was used for experimental purposes and is therefore used for purposes of expressing weight percentages herein. Therefore, if one wishes to use the hydrated form, the weight percentages expressed herein can be adjusted accordingly.

Similarly, the alkali metal or alkaline earth metal borates useful in this invention can be in either the hydrated or anhydrous form. Furthermore, the terms alkali metal or alkaline earth metal borate are meant to include any form of the alkali metal or alkaline earth metal borate which can be easily converted to the metaborate ($BO_2^{-1}$) or tetraborate ($B_4O_7^{-2}$) form by aqueous or thermal treatment or a combination of treatments. Such forms could contain $BO_2^{-1}$, $B_2O_4^{-2}$, $B_3O_6^{-3}$ (methaborates), $BO_3^{-3}$ (orthoborate), $B_4O_7^{-2}$ (tetraborate), and $B_5O_{10}^{-5}$ (pentaborate). Preferred forms of the alkali metal or alkaline earth metal borates are the metaborates ($BO_2^{-1}$) and tetraborates ($B_4O_7^{-2}$) due to availability. The anhydrous form of the alkali metal or alkaline earth metal borates, where the borate anion was $B_4O_7^{-2}$ was used for experimental purposes and is therefore used for purposes of expressing weight percentages herein. Again, if the hydrated form of the alkali metal or alkaline earth metal borate is to be employed, weight percentages must be adjusted.

The amount of lithium sulfite employed is that effective to reduce the tendency of the molten poly(arylene sulfide) to cause corrosion of metal in contact therewith. Generally, the amount of the lithium sulfite employed is in the range of about 0.1 to about 20 weight percent, preferably about 0.45 to about 5 weight percent, and more preferably about 0.5 to about 2 weight percent, where the weight percent is based on the weight of the poly(arylene sulfide) resin, exclusive of colorants, fillers, reinforcing agents, other additives, and the like.

Further according to my invention lithium sulfite and at least one of an alkali metal or alkaline earth metal carbonate, an alkali metal or alkaline earth metal borate, or mixtures thereof can be employed with the poly(arylene sulfide) resin in order to reduce metal corrosion.

Generally the amount of lithium sulfite employed, when used with the alkali metal or alkaline earth metal carbonate or alkali metal or alkaline earth metal borate is in the range specified above; and the amount of the alkali metal or alkaline earth metal carbonate, alkali metal or alkaline earth metal borate, or mixture thereof, employed is in the range of about 0.1 weight percent to about 19.6 weight percent based on the weight of the poly(arylene sulfide) resin, exclusive of colorants, fillers, reinforcing agents, other additives, and the like.

The amount of alkali metal or alkaline earth metal carbonate, alkali metal or alkaline earth metal borate, or mixture thereof should be such that the total amount of lithium sulfite and alkali metal or alkaline earth metal carbonate, alkali metal or alkaline earth metal borate, or mixture thereof does not exceed about 20 weight percent, based on the weight of the poly(arylene sulfide) resin, exclusive of colorants, fillers, reinforcing agents, other additives, and the like. It is noted that certain carbonate compounds disclosed herein as corrosion inhibitors notably sodium carbonate and calcium carbonate, can also be employed as fillers in poly(arylene sulfide) resins. If such carbonates are employed as fillers, they can exceed the weight percentages expressed herein without adversely affecting the resins. Therefore, if a carbonate compound is employed as a filler, the weight percentage disclosed herein must be adjusted accordingly. A preferred ratio of the amount of alkali metal or alkaline earth metal carbonate and/or alkali metal or alkaline earth metal borate to the amount of lithium sulfite in the combination is 1:1; a preferred amount of the combination in the resin is in the range of 0.5 to about 2 weight percent.

The term alkaline earth metal includes beryllium, magnesium, calcium, strontium, barium and radium. The term alkali metal includes lithium, potassium, sodium, rubidium, and cesium. Examples of suitable alkali metal or alkaline earth metal carbonates include lithium carbonate, potassium carbonate, sodium carbonate, rubidium carbonate, cesium carbonate, beryllium carbonate, magnesium carbonate, calcium carbonate, strontium carbonate, and barium carbonate. Magnesium, calcium, and barium carbonates are preferred. Especially preferred is barium carbonate. As mentioned above, any form of the alkali metal or alkaline earth metal borate can be used. For example, $K_2B_4O_7$, potassium tetraborate, or $KBO_2$, potassium metaborate can be used, although potassium tetraborate is preferred due to availability. Other examples of suitable alkali metal or alkaline earth metal borates include calcium metaborate, calcium tetraborate, lithium metaborate, lithium tetraborate, magnesium metaborate, sodium metaborate, sodium tetraborate and strontium tetraborate.

According to my invention it is essential for optimum corrosion inhibition that an intimate mixture of the poly(arylene sulfide) resin and the lithium sulfite, and alkali metal or alkaline earth metal carbonates and/or alkali metal or alkaline earth metal borates, if added as described, be formed before the metal that is subject to the described corrosion is placed in contact with the molten resin. The term "intimate mixture" as used herein is intended to denote a mixture in which the ingredients are predominantly uniformly distributed throughout the composition. The mixing may be accomplished by any suitable method known to those skilled in the art. A method for forming an intimate mixture of the poly(arylene sulfide) resin and one or more of the above listed inhibitors is to dry mix the materials prior to the melting of the resin. For example, the dry inhibitors can be mixed with the poly(arylene sulfide) resin powder in a dry mixing apparatus such as a Banbury mixer, or the constituents to be mixed can be placed in a tumble-type curing vessel. The dry mix can then be further processed into pellets by techniques well known in the art. In another method, the inhibiting additives can be melt mixed with the poly(arylene sulfide) resin by running the constituents concurrently through an extruder.

Any poly(arylene sulfide) resin which is used in molding processes can be benefited through use of my invention. The invention can be used, for example, with polymers prepared by the solution reaction of polyhalo compounds with alkali metal sulfides as described in U.S. Pat. No. 3,354,129. If it is desired to employ poly(arylene sulfide) resins of lower melt flow than those obtained through the process of the above mentioned patent, the polymers obtained in that process can be modified according to the method disclosed in U.S. Pat. No. 3,793,256. Usually, the poly(arylene sulfide) resin will contain repeat units of the formula [Ar-S] wherein Ar is a divalent aromatic radical. Preferred divalent aromatic radicals can be independently selected from the group consisting of phenylene, biphenylene or naphthylene.

Other poly(arylene sulfide) type resins which can be benefited through use of my invention are aromatic sulfide/sulfone polymers, characterized as having recurring units,

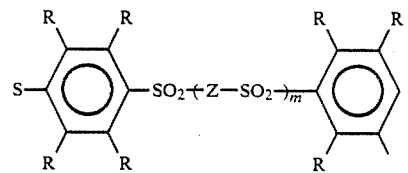

where Z is a divalent radical selected from the group consisting of

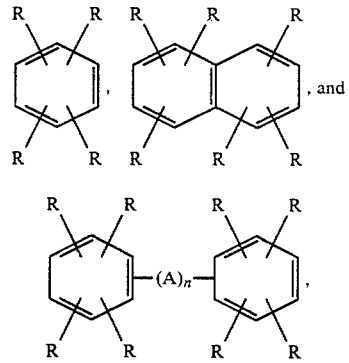

m is 0 or 1, n is 0 or 1, A is selected from the group consisting of sulfur, sulfonyl and $CR_2$, and each R is selected from the group consisting of hydrogen and alkyl radicals having 1 to about 4 carbon atoms, the total number of carbon atoms in all of the R groups in the molecule being 0 to about 12. Preferably, m is 0. The preparation of these polymers is described in U.S. Pat. No. 4,127,713.

My invention can also be employed with poly(arylene sulfide-ketone) resins. The poly(arylene sulfide-ketone) resins can be prepared as described in U.S. Pat. No. 4,716,212 by the reaction of an aromatic dihalo compound in which each halogen atom is activated by a keto group present in the paraposition, with an essentially equivalent amount of an alkali metal sulfide in a polar solvent. The preferred poly(arylene sulfide-ketone) will be insoluble in 1-chloronaphthalene at 230° C. Usually, a poly(phenylene sulfide-ketone) having repeat units of the type

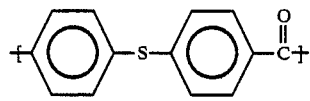

is employed.

The present invention is particularly useful for the poly(arylene sulfide) resins often called poly(phenylene sulfide) resins. P-phenylene sulfide polymers can be prepared as described in U.S. Pat. No. 3,919,177, wherein p-phenylene sulfide polymers are produced by reacting at least one p-dihalobenzene with a mixture in which at least one suitable source of sulfur, at least one alkali metal carboxylate, and at least one organic amide are contacted. Since the techniques of producing poly(arylene sulfide) resins disclosed in the above-mentioned patents are known to those skilled in the art, further description of those processes will not be set forth herein. For more detail one may refer to the specific patents, which are incorporated herein by reference.

Molding grade poly(phenylene sulfide) resins can be molded into a variety of useful articles by molding techniques which are known in the art. Molding generally is carried out above the melting point of the particular polymer being molded. Suitable molding techniques include injection molding, compression molding, vacuum molding, and the like. While the present invention is particularly suitable for preventing corrosion that occurs when poly(phenylene sulfide) resins are injection molded, the invention will substantially eliminate corrosion that occurs as a result of any of the molding techniques enumerated above, or any technique involving contacting of metal with molten poly(arylene sulfide) resins, such as, for example, extrusion.

The metals involved in the molding or extruding process which are subject to corrosion are generally those made of beryllium, copper, and Vega tool steel. Metals which are less susceptible to corrosion but more expensive to employ include 303 Stainless steel, 304 Stainless steel, 316 Stainless steel, and chrome or nickel plating.

Like any other poly(arylene sulfide) resin compositions, the resin compositions of my invention have utility in uses where high melting point and high temperature stability are desirable. The poly(arylene sulfide) resins of my invention can also include other additives such as fillers, pigments, stabilizers, softeners, extenders, and other polymers. In injection molding, for example, it is usual to prepare poly(arylene sulfide) resin compositions containing about 20 to about 50 weight percent of glass fiber filler, based on the weight of the poly(arylene sulfide) resin and the glass fiber filler. Generally glass fibers about ⅛ inch to about 1 inch in length are employed. Also as known in the art such glass filled compositions can be prepared by feeding continuous glass roving through an extruder along with the thermoplastic. Of course, it would be counterproductive to employ an additive which increases the corrosion tendency of the present inventive composition.

The present invention and its advantages are further demonstrated by the following example.

EXAMPLE I

This example describes the process used to evaluate mold corrosion inhibitors for poly(arylene sulfide) resins. The general procedure is as follows: the lithium salt additive, usually 0.05 grams, was mixed for about 5 minutes with a mortar and pestle with 5 grams of poly(phenylene sulfide) (melt flow rate 140-220 grams/10 minutes measured in accordance with test method ASTM D 1238, Procedure B modified to use condition 315/5.0 with a 5 min. preheat time). Degreased, cold-rolled, carbon steel coupons, 1 inch×1 inch×0.035 inch were placed in small aluminum pans and covered with the poly(phenylene sulfide) (PPS) -additive mixture. Two controls were also prepared for simultaneous testing, one where only the PPS without the additive was used and one where PPS+1 weight percent $Li_2CO_3$ was used. The pans containing the PPS-covered steel coupons were placed in a large air circulating oven at 370° C. for 3 hours. After cooling, the PPS covering was removed from the coupons which were then placed on a rack situated in a closed jar containing some water with the coupons above the water level. After 2 hours exposure to water vapor at ambient room temperature, the coupons were removed and allowed to stand overnight at ambient laboratory conditions. The coupons were then judged as good, fair, or poor with regard to corrosion inhibition. The control containing 1 weight percent $Li_2CO_3$ was rated good because it did not appear to contribute to rust particles on the metal surface whereas the control containing only PPS without any additive was rated poor because it resulted in brown-looking rust and had an overall bad appearance.

Using the procedure described a number of lithium salts were evaluated. These results are listed in TABLE I:

TABLE I
Effect of Li Sulfite as a Corrosion Inhibitor During Molding of Poly(p-Phenylene Sulfide)

| Run No. | Additive | Wt. % Additive | Rating[a] |
|---|---|---|---|
| Comparison: | | | |
| 1 | None | — | Poor |
| 2 | Lithium Carbonate ($Li_2CO_3$) | 1.0 | Good |
| 3 | Lithium Carbonate ($Li_2CO_3$) | 0.5 | Good |
| 4 | Lithium Phosphate ($Li_3PO_4$) | 1.0 | Poor |
| Invention: | | | |
| 5 | Lithium Sulfite ($Li_2SO_3$)[b] | 1.0 | Good |
| 6 | Lithium Sulfite ($Li_2SO_3$) | 0.5 | Good |
| 7 | Lithium Sulfite ($Li_2SO_3$) | 0.3 | Poor |
| 8 | 1:1 Lithium Sulfite:$BaCO_3$ | 1.0 | Good |
| 9 | 1:1 Lithium Sulfite:Potassium Borate[c] | 1.0 | Good |

[a] Ratings: Good = No brown rust. Fair = Some brown rust, possibly light rust coat. Poor = Covered with brown rust, usually heavy layer.
[b] Anhydrous Form. [c] $K_2B_4O_7$, potassium tetraborate was used.

The data in Table I demonstrates that lithium sulfite, $Li_2SO_3$, when incorporated in PPS substantially eliminates corrosion of carbon steel during molding at 370° C. (Runs 5 and 6). However, the incorporation of lithium sulfite at levels lower than about 0.4 weight percent is less effective in the elimination of corrosion (Run 7). Blending $Li_2SO_3$ with an alkali metal borate, potassium borate ($K_2B_4O_7$) (Run 9), or an alkaline earth metal carbonate, barium carbonate (Run 8), is also effective in reducing corrosion during PPS molding. The data also show that the control $Li_2CO_3$, which is the standard used in PPS, is a good mold corrosion inhibitor but that another lithium compound lithium phosphate, $Li_3PO_4$, is not a good mold corrosion inhibitor.

While this invention has been described in detail for the purpose of illustration, it is not to be construed as That which is claimed is:

1. A method for forming shaped products of normally solid poly(arylene sulfide) resin comprising a) forming a poly(arylene sulfide) resin composition comprising poly(arylene sulfide) resin having incorporated therein an effective amount of a corrosion inhibitor comprising lithium sulfite, and b) molding said poly(arylene sulfide) resin composition.

2. A method in accordance with claim 1 wherein said lithium sulfite is employed in an amount in the range of about 0.1 to about 20 weight percent, based on the weight of said resin.

3. A method in accordance with claim 1 wherein said poly(arylene sulfide) resin is a molding grade poly(phenylene sulfide) resin.

4. A method in accordance with claim 1 wherein said resin is poly(phenylene sulfide) resin and said poly(phenylene sulfide) resin contains glass fiber fillers.

5. A method for improving a poly(arylene sulfide) resin so that it will be less likely to cause metal to corrode as a result of having been in contact with molten poly(arylene sulfide) resin, said method comprising incorporating into an already prepared poly(arylene sulfide) resin an effective amount of a corrosion inhibitor comprising lithium sulfite.

6. A method in accordance with claim 5 wherein said lithium sulfite is employed in an amount in the range of about 0.1 to about 20 weight percent, based on the weight of said poly(arylene sulfide) resin.

7. A method in accordance with claim 5 wherein said lithium sulfite is employed in an amount in the range of about 0.45 to about 5.0 weight percent, based on the weight of said poly(arylene sulfide) resin.

8. A method in accordance with claim 5 wherein said poly(arylene sulfide) is poly(phenylene sulfide) resin.

9. An admixture comprising poly(arylene sulfide) resin and a corrosion inhibiting amount of lithium sulfite.

10. An admixture in accordance with claim 9 containing said lithium sulfite in the range of about 0.1 to about 20 weight percent based on the weight of said poly(arylene sulfide) resin.

11. An admixture in accordance with claim 9 wherein the poly(arylene sulfide) resin is a molding grade poly(phenylene sulfide) resin.

12. An admixture in accordance with claim 9 wherein the poly(arylene sulfide) resin is poly(phenylene sulfide) resin and said poly(phenylene sulfide) resin contains glass fiber fillers.

* * * * *

UNITED STATES PATENT AND TRADEMARK OFFICE
CERTIFICATE OF CORRECTION

PATENT NO. : 4,916,179
DATED      : April 10, 1990
INVENTOR(S) : Van C. Vives

It is certified that error appears in the above-identified patent and that said Letters Patent is hereby corrected as shown below:

Column 1, line 31, "mold" should be --molds--.

Column 4, line 22-29.

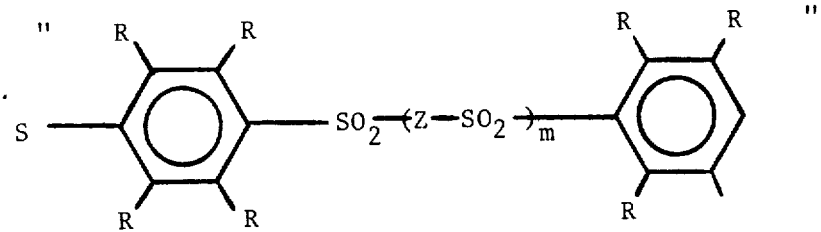

should be

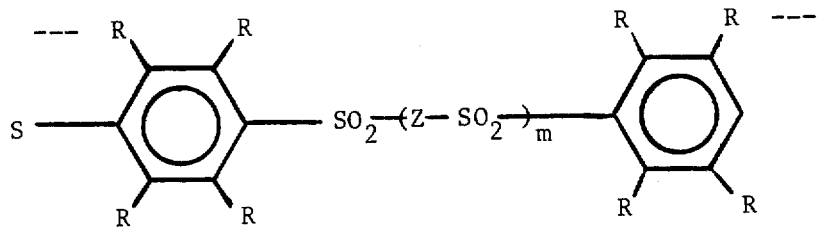

Signed and Sealed this

Fifteenth Day of September, 1992

Attest:

DOUGLAS B. COMER

*Attesting Officer*     *Acting Commissioner of Patents and Trademarks*